June 5, 1962  J. BERNHARD  3,037,393
SCREW THREAD CUTTING DEVICE
Filed Jan. 23, 1958  4 Sheets-Sheet 3

Inventor:
Johann Bernhard
By:
Attorney

June 5, 1962    J. BERNHARD    3,037,393
SCREW THREAD CUTTING DEVICE
Filed Jan. 23, 1958    4 Sheets-Sheet 4
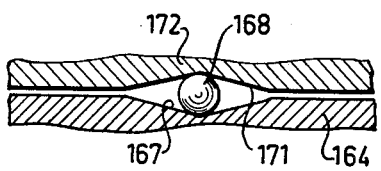
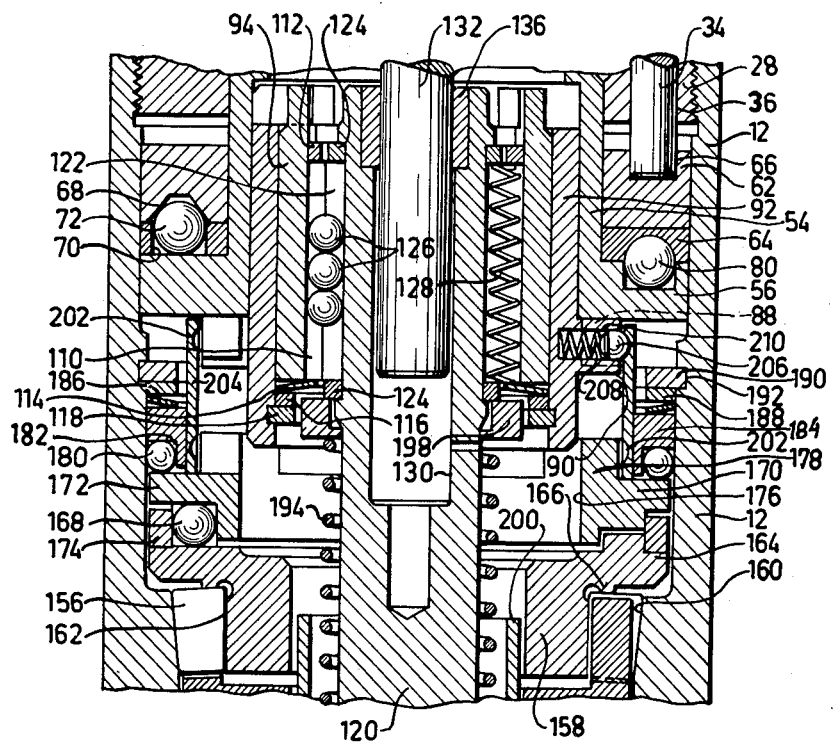
Inventor:
Johann Bernhard
By:
Attorney

United States Patent Office 3,037,393
Patented June 5, 1962

3,037,393
SCREW THREAD CUTTING DEVICE
Johann Bernhard, Nacka, Sweden, assignor to Aktiebolaget Svenska Precisionsverktyg, Nacka, Sweden, a corporation of Sweden
Filed Jan. 23, 1958, Ser. No. 710,777
Claims priority, application Sweden Jan. 26, 1957
16 Claims. (Cl. 74—205)

This invention relates to a screw thread cutting device.

More particularly this invention relates to a screw thread cutting device comprising a driving component, a driven component and members for transmitting torque between said components including coupling members.

Still more particularly this invention relates to a screw thread cutting device comprising a driving component, a driven component, torque transmitting members for transmitting direct drive between said components including coupling members, and torque transmitting members for transmitting drive in reversed direction between said components including reverse drive members operatively connectable with said driving component to rotate in the direction opposite that of the driving component.

Still more particularly this invention relates to a screw thread cutting device comprising a driving component, a driven component, torque transmitting members for transmitting direct drive between said components including coupling members, and torque transmitting members for transmitting drive in reversed direction between said components including reverse drive members operatively connectable with said driving component to rotate in the direction opposite that of the driving component, one of said concentrically disposed coupling members being axially shiftable relatively to said components from a first position engaging the driving component to transmit torque between said components in direct drive relation to a second position engaging said reversed drive member to transmit torque between said components in reverse drive relation.

One main object of the invention is to provide a screw thread cutting device of the type set forth adapted to ensure soft application of the pilot or screw tap carried by the driven component even if the position of said pilot tap relative to the pre-bored hole to be provided with threads is misestimated by the operator of the device.

Another object of the invention is to provide a screw thread cutting device of the type set forth with effective means for protecting the coupling members and the reversed drive members against damages and other troubles due to the resetting of the device from direct to reversed drive and vice versa.

A further object of the invention is to provide a screw thread cutting device of the type set forth comprising means rendering possible an equal increase of the engagement between the reversed drive members so as to keep the inevitable frictional heat at a value not disturbing the operation of the device.

Still another object of the invention is to provide a screw thread cutting device of the type set forth comprising means substantially completely releasing the pilot tap from the torque when the resistance against rotational movement of the tap exceeds a predetermined value, said value being exceeded for example when the tap has reached the bottom of a pre-bored hole closed at the base.

Further objects and advantages of the invention will become apparent from the following description considered in connection with the accompanying drawings which form part of this specification and of which:

FIG. 6 is a cross-section along line VI—VI of FIG. 1.

FIG. 7 is an axial cross-section of an intermediate portion of a second embodiment of the screw thread cutting device constructed according to the invention.

Figure 1:
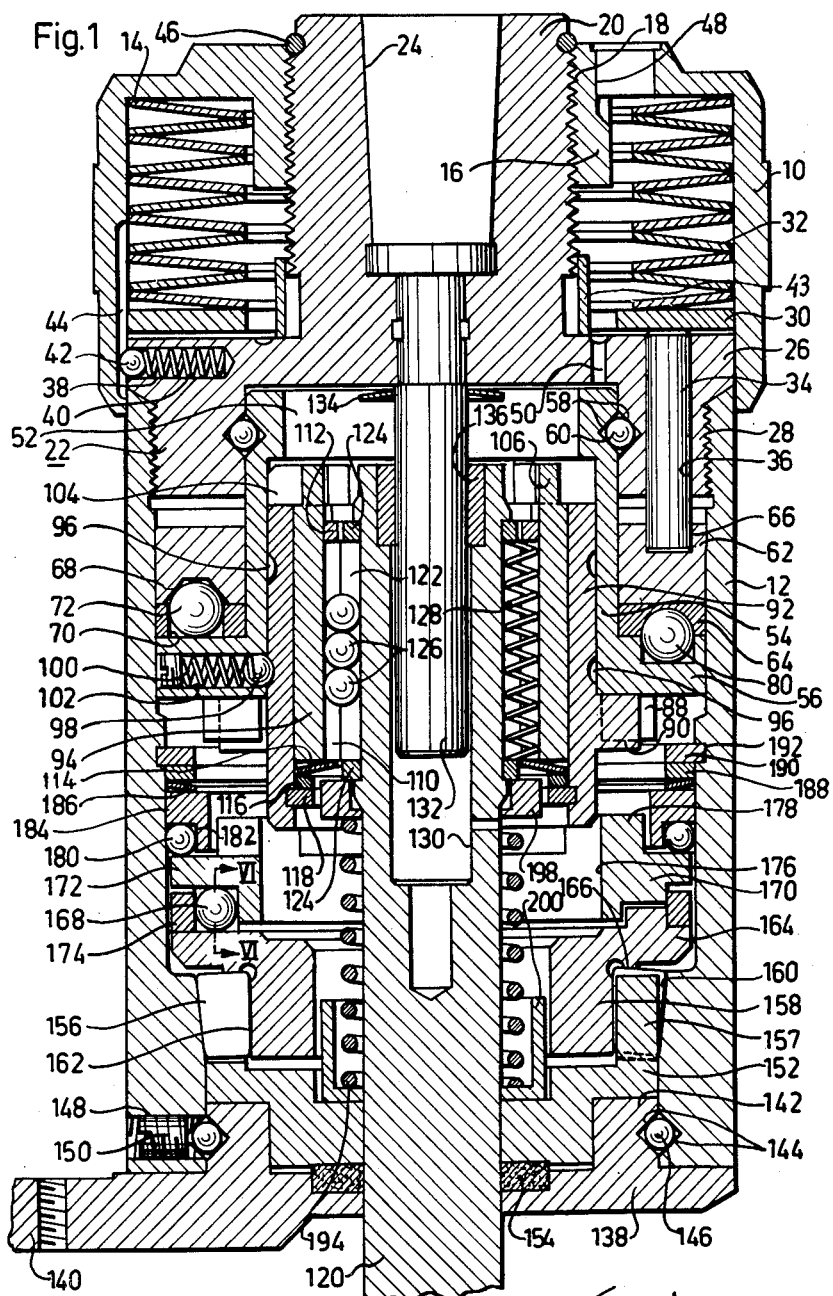
FIG. 1 is an axial cross-section through a screw thread cutting device constructed according to the invention.

Referring to the drawings, reference numeral 10 denotes an upper cylindrical casing receiving in its open lower end with a sliding fit the upper portion of a sleeve-shaped part 12. In its closed end portion 14, the casing 10 has a central through-bore which is continued towards the interior of the device through a reinforcing, inwardly directed flange portion 16 and which is provided with an internal thread 18. Within this through-bore a central stud-shaped portion 20 of a supporting body 22 is secured by screw-connection, said stud-shaped portion being provided with a corresponding external thread. The top end of the portion 20 is formed with an axial tapered bore 24 for connection with a driving spindle not shown in the drawings. Below said stud portion the supporting body 22 has a circular flange 26 projecting to the internal wall of the sleeve-shaped casing 10. Said flange 26 has at its base an annular portion 28 fitted with an external thread for receiving the corresponding internal thread formed in the top end of the sleeve-shaped part 12. Disposed between the end wall 14 of the casing 10 and an annular member 30 applied on the flange 26 are cup springs 32 adapted to act through the annular member 30 upon the top ends of coupling pins 34, said pins, the number of which suitably is six, are in circumferentially equally spaced relationship slidably mounted in a corresponding number of bores 36 axially penetrating through the flange 26 and the portion 28 of the supporting body 22. For the purpose of rotationally locking the body 22 and the casing 10 in relation to one another, said body has three radial bores 38 disposed in circumferentially equally spaced relationship and each receiving a helical spring 40 and externally thereof a ball 42 adapted to snap into a number of grooves 44 formed axially in the internal wall of the casing 10 and further a stop ring 43 adapted to cooperate with the flange portion 16. Said stop ring prevents the springs 32 from being completely compressed. For the purpose of locking the thread connection between the body 22 and the casing 10 a retainer ring 46 is placed in a groove provided in the external transition between said parts. The end portion 14 of said casing 10 is formed with a closable opening 48 for introduction of a lubricant which may be conducted further into the device through a passage 50 debouching into an annular space 52 formed within the annular portion 28 of the supporting body 22.

Figure 2:
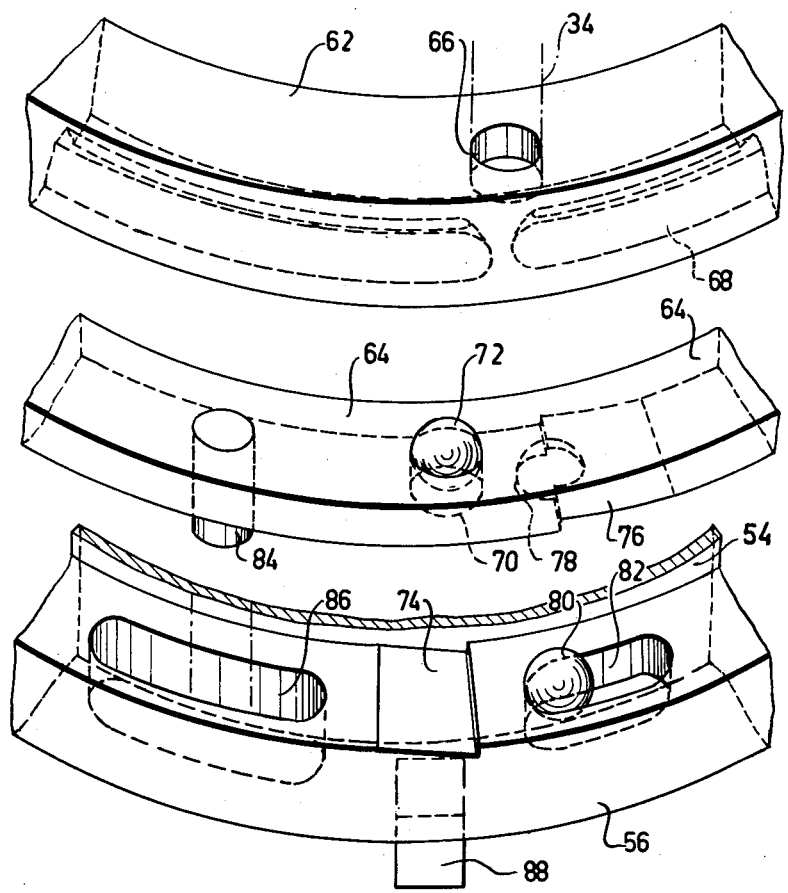
FIG. 2 is a perspective view of portions of coupling rings forming part of the device shown in FIG. 1 on a larger scale, said portions being spaced axially from one another.
Figure 4:
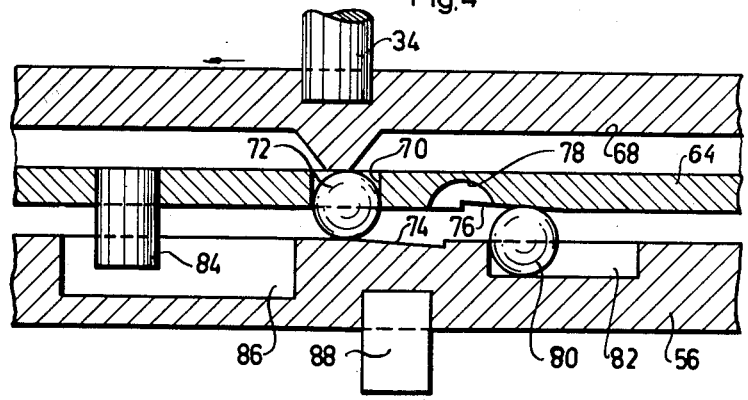
FIG. 4 is the same view as presented in FIG. 3, but with the rings in a disengaged position.
Figure 5:
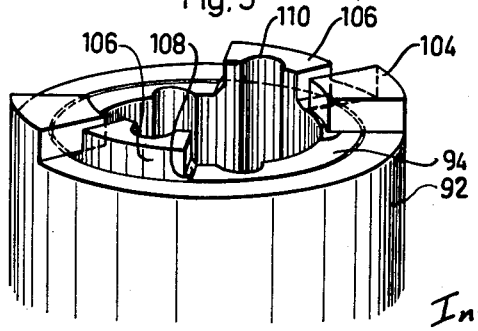
FIG. 5 is a perspective view on a larger scale than in FIG. 1 of a portion of two coupling sleeves forming part of the device shown in said figure, said coupling sleeves being rotatable one within the other.

The upper end portion of a coupling sleeve 54 projects into said annular space 52 and forms therein a rotatable sliding fit, said coupling sleeve being provided with an outwardly projecting annular flange 56 located at the end opposite the upper end portion. In order to fix the axial position of the coupling sleeve 54 and the body 22 relatively to one another, opposed annular grooves 58 are provided in said elements and house together a ring of balls 60. Two annular members, of which an upper one is denoted 62 and a lower one 64 are disposed with a sliding fit on the coupling sleeve 54 between its lower flange 56 and the lower face of the annular portion 28 of the supporting body 22. From the top surface of the upper ring 62 a plurality of bores 66 closed at the base is provided for receiving the lower ends of the coupling pins 34. In the embodiment illustrated the number of bores 66 is six. Said ring 62 is on its lower face formed with peripherally extending and even distributed grooves or recesses 68, the number of which in the embodiment shown is three. The end portions and the side walls of said recesses slope downwardly towards the base of said grooves. They are disposed right opposite three circular bores 70 in the lower ring 64, which bores receive balls 72 dimensioned so as to be capable of passing through said bores and in an upper position and entering the recesses 68 suitably with less than one half of their diameter. The top side of the flange 56 of the coupling sleeve 54 is formed with sloping races 74 (FIGS. 2, 3 and 4) for the balls 72, which ways have the same circumferential distribution as the bores 70 and have their slope in the same circumferential direction. In the same manner three circumferentially evenly distributed races 76 are provided on the base face of the ring 64 and slope relatively to said face in a direction opposite to that of the ways 74. The end of each of these races 76 which are circumferentially displaced in relationship to the bores 70 is provided with a part-spherical recess 78, the center of which is approximately alined with the end of the races 76, where these races have their greatest depth calculated from the base face of the ring 64. When the ring 64 and the flange 56 have taken a predetermined rotational position relative one another, said recesses 78 will receive slightly less than half of a ball 80, the remaining part thereof which being accommodated in a circumferentially extending groove or recess 82 of which a corresponding number is provided on the top side of the flange 56. For a further limiting of the rotative movement between the ring 64 and the flange 56, a number of downwardly directed pins 84 are mounted on said ring, so as during displacement of said elements 64 and 56 relatively to one another to be movable in peripherally extending grooves 86 provided on the top side of the flange 56. In addition, two diametrically opposed shoulders 88 are secured to the base face of the flange 56. These shoulders 88 are formed to engage two likewise diametrically opposed and radially extending shoulders 90 formed as projections from an intermediate sleeve 92 disposed with a sliding fit within the coupling sleeve 54, said intermediate sleeve in turn receiving with a similar fit an inner sleeve 94. The sleeve 92 is adapted to be locked in one or the other of two axial positions in relationship to the coupling sleeve 54 by two axially spaced annular grooves 96 provided in the external wall of the sleeve 92. Said grooves are adapted alternatingly to be brought to engagement with three balls 98 of which each is displaceable under the load of a helical spring 100 in a radial bore 102 which in a corresponding number and with circumferentially even spacing are formed in the flange portion 56. The sleeve 92 is further at its upper edge provided with two opposed shoulders 104 (FIG. 5) directed radially inwards and projecting over the top edge of the sleeve 94 mounted within the sleeve 92. The sleeve 94 has two radially opposed shoulders 106 extending radially inwardly from the upper edge thereof and formed for co-operation by disconnectable engagement with the shoulders 104 of the sleeve 92. The transitional portion between the edge of the sleeve 94 and the shoulders 106 may be shaped as a diagonal surface 108. Grooves 110 extend axially along the internal wall of the sleeve 94 and are evenly distributed over the circumference. Said grooves have preferably a part-circular cross-sectional shape. In the embodiment shown there are six such grooves. At their top ends the grooves are terminated by a locking ring 112 and at the bottom ends by a cup spring 114 bearing on a spacer ring 116 and actuating the sleeve 94 upwardly. Said spacer ring 116 rests upon a locking ring 118 which is rigidly secured to the intermediate sleeve 92 by engagement with an internal annular groove formed on the internal face of said sleeve. Opposite the grooves 110 correspondingly shaped grooves 122 are formed in an enlarged end portion of an outgoing spindle 120 so as together with the grooves 110 to form axial channels. The grooves 122 are defined at both ends by locking rings 124. Balls 126 are introduced into every second one of the channels formed by the grooves 110 and 122, the number of said balls being three balls in each channel of the embodiment illustrated, the remaining channels housing helical springs 128, the ends of which bear on the locking rings defining the channels. The outgoing spindle 120 has at its end portion located within the screw thread cutting device an axial bore 130 housing a guide rod 132 secured to the supporting body 22. At the place of connection of the guide rod 132 to said body a cup spring 134 is disposed and a bearing sleeve 136 is interposed between the bore 130 of the spindle 120 and said rod. The free end of the spindle 120 is shaped in known manner and not illustrated in the drawings so as to be connectable to a chuck carrying a pilot or screw tap.

The sleeve 12 connected with the supporting body 22 is closed at its lower open end by means of a circular disc 138. Said disc has a radially projecting arm 140 and an annular flange 142 entering into the interior of the sleeve. The disc 138 is rotatably connected with the sleeve by opposed annular grooves 144 formed in the internal wall of the sleeve 12 and the external wall of the annular portion 142, respectively, said grooves housing a series of balls 146. Said balls have been introduced into the grooves through a radial passage 148 which is kept sealed by means of a threaded plug 150. A retainer ring 152 is connected in any suitable way with the inwardly projecting annular flange 142 of the disc and is suitably entirely made of some antifriction metal. Its external shape conforms to the interior of the annular flange and its inner bore receives in a slidable manner the spindle 120, which also passes through a felt ring 154 and projects out of the device through a bore in the disc 138. On its top side the retainer ring 152 carries a number of circumferentially evenly distributed roller bodies 156 shaped like truncated cones tapering downwards and in a manner known per se and not illustrated in the drawings mounted for free rotation between projections 157 extending from the top face of the retainer ring 152 and provided with bearing surfaces for the roller bodies. Said projections 157 keep the roller bodies apart. The roller bodies 156, which have a very small cone angle amounting to about 7°, for example, have for their purpose to transmit the torque from the sleeve 12 to a reversing ring 158 centered within said sleeve. With their external face the roller bodies engage a tapered roller way 160 provided on an enlarged portion of the sleeve and with their internal face they engage a correspondingly formed roller way 162 provided on the external peripheral face of the reversing ring 158. The axial position of the roller bodies is determined at the base by the tapered roller ways 160 and 162 and at the top by a flanged portion 164 projecting from the reversing ring 158 by means of an annular projection 166 extending from the base face thereof engaging the top zone of the roller bodies. The top face of said flanged portion 164 is provided with a plurality of recesses 167 evenly distributed over the circumference. Said recesses 167 the number of which is three in the illustrated embodiment (see FIG. 6) suitably have a V-shaped section viewed in a radial direction, or they are otherwise shaped so as to cause balls 168 disposed in said recesses to roll in the peripheral direction from their lowest position in the recesses along the inner faces of the recesses to positions on a higher level. The balls 168 are retained in said recesses by a coupling ring 170 which is provided adjacent its top end with an outwardly projecting annular flange 172, which on its base face is formed with corresponding grooves 171 presenting a V-shaped cross-section and receiving the balls 168. In the radial direction said balls are locked by an annular member 174 disposed between the flange portion 164 of the retainer ring 152 and the flange 172. Adjacent the inner bore 176 of the coupling ring 170 the flange 172 has two diametrically opposed and axially extending shoulders 178. In addition said flange 172 is provided with a race for an annular series of balls 180 guided between the external wall of the sleeve 12 and an annular groove 182 formed in a ring 184 disposed on top of said balls and fixed axially at its top by a cup spring 186 which by a spacer ring 188 is kept pressed against the ring 184 by means of a locking ring 190 disposed above the spacer ring and inserted into an annular groove 192 formed in the internal wall of the sleeve.

Disposed between the holder ring 152 and the outgoing spindle 120 is a helical spring 194 which is slipped onto the spindle. The other end of said spring 194 bears on a cup 200 resting on the internal face of the retainer ring 152. The spindle passes centrally through the base of said cup the inwardly directed free edge of which, when the spring 194 is compressed, forms an abutment against the base of a further cup 198 which is formed substantially similarly and the upper edge of which bears on the lower one of the locking rings 124 axially defining the grooves 122 provided on the spindle 120.

The embodiment shown in FIG. 7, the details of which as far as they are identical with those contained in the embodiment shown in FIGS. 1-6 are designated by the same reference numerals and which thus regarding said details does not require any description, does not differ from the embodiment already described but by different location of the mechanism retaining the sleeves 92 and 94 in two different axial positions within the screw thread cutting device. The peripherally extending annular grooves 96 of FIG. 1 have been substituted by annular grooves 202 formed in the internal face of a sleeve-shaped and axially stationary element 204. This element passes through the interior of the rings 184, 188 and 190 and extends from the top surface of the flange 172 of the coupling ring 170 past the peripheral end faces of the coupling shoulders 88, 90 and to the adjacency of the lower surface of the annular flange 56 of the coupling sleeve 54. The balls 98 have been substituted by two balls 206 which are introduced each into a passage 210 bored radially through the shoulders 90. The passages house helical springs 208 acting upon the balls 206 in a direction towards the grooves 202. In this way any braking effect by the turning movement of the coupling sleeve 54 and the outer sleeve 92 relative to one another is eliminated.

Figure 3:
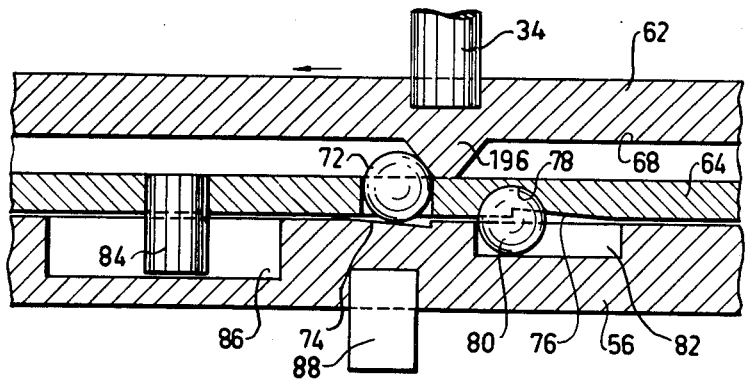
FIG. 3 is a flattened side elevation of the coupling rings shown in FIG. 2 in assembled position and with the rings engaging one another.

When effecting thread cutting operation the components of the device described hereinbefore are in the positions illustrated in FIGS. 1, 3 and 7. At the very engagement of the pilot or screw tap into the pre-bored hole closed at the base and supposed to be located below the device shown in the drawings the spindle 120 has a possibility of moving upwards against the pressure exerted by the springs 128 until the top end of the spindle strikes the cup spring 134. However, the spindle returns to the position shown after the pilot tap has gripped the bore. The torque is transmitted from the driving spindle (not shown) through the body 22 and the coupling pins 34 to the upper coupling ring 62 and from said ring through the balls 72 to the intermediate ring 64 and from said ring through the balls 80 to the coupling sleeve 54. The shoulders 88 of said sleeve, which are in engagement with the lower shoulders 90 of the intermediate sleeve 92, transmit the torque to the inner sleeve 94 through the upper, radial shoulders 104 of the sleeve 92 and the shoulders 106 of the sleeve 94 and, finally, from the sleeve 94 through the balls 126 to the outgoing spindle 120 carrying the chuck holding the pilot or screw tap (not shown).

When the pilot tap has reached the bottom of the bore, the coupling members recited above will retain, as is easily understood, the coupling sleeve 54 against rotation. As the upper ring 62 continues to rotate in the direction indicated by the arrow in FIG. 3, the balls 72 will slide along the separating portions 196 between the grooves 68 so as to cause the ring 62 to be elevated against the action of the cup springs 32. At the same time the balls 80 slide up onto the sloping surfaces 76 due to the fact that they engage one end of the grooves 82 in the flange 56 of the coupling sleeve 54. When the balls 80 have slid along a part of said surfaces 76, the balls 72 have slipped out of the grooves 68 up onto said separating portions 196. As the friction force between the spring-loaded ring 62 and the lower ring 64 produces a certain torque, the balls 80 will continue to slide further up onto the sloping way until they are adjacent the end of the way when the pins 84 reach one end of the grooves 86. The only force able to transmit a torque is now constituted by the sliding friction between the lower surface of the ring 62 and the intermediate ring 64, and the torque acting upon the screw tap is thus considerably released. The magnitude of the torque which the device is able to transmit may be controlled by adjusting the spring load acting on the coupling pins 34 and as a result thereof on the upper ring 62. Said control is accomplished by a turning movement of the supporting body 22 and the casing 10 relative to one another so as to cause compression of the cup springs 32 to a predetermined variable value.

When the device is to be reversed, which implies unscrewing of the pilot tap from the bore, the driving spindle is elevated which for the sake of simplicity may be supposed to be performed as a descending movement of the spindle 120. This descent of the spindle causes compression of the springs 128 until the balls 126 contact the upper locking ring 124 and the cup spring 114. A further descending movement of the spindle 120 causes the cup spring 114 to be actuated downwards. Said actuation is transmitted to the sleeves 92 and 94 so as to cause the balls 98 locking the sleeve 92 to be displaced outwards against the action of the springs 100. As a result said sleeves are moved axially downwards in a snap-like movement until the balls 98 engage the upper annular groove 96 of the sleeve 92.

In the embodiment shown in FIG. 7 the same effect is produced by the balls 206 operating in the same way as the balls 98 being forced to change their engagement from the upper to the lower annular groove 202 of the axially stationary sleeve 204. The coupling shoulders 90 of the outer sleeve 92 are thus caused to disengage the coupling shoulders 88 of the coupling sleeve 54 and engage thereupon the shoulders 178 of the coupling ring 170. This movement of the spindle is effected against the action of the spring 194. The turning of the coupling ring 170 and the reversing ring 158 relative to one another produced by the constantly continued rotation of the reversing ring 158 results in the balls 168 rolling peripherally up onto the V-shaped grooves 167, 171 so as to force the reversing ring 158 and the ring 170 to move axially against the action of the cup spring 186 in such a way as to cause the reversing ring 158 by means of the annular projection 166 to force the roller bodies 156 between the tapered roller ways 160, 162. The force exerted by the projection 166 on the roller bodies 156 depends on the resistance met in the bore-hole by and transmitted from the pilot tap. The outgoing spindle 120 is thus given a reversed movement since the base disc 138 and through said disc the retainer ring 152 are kept rotationally stationary by the arm 140. In the reversing operation any transmission of the torque is thus not effected prior to the moment when it is required, because the balls 168 during the direct drive take their positions in the bottom of the grooves 167, 171 under such a balanced load from the cup spring 186 as to cause the roller bodies 156 only slightly to touch the roller ways 160, 162. Thus the balls 168 are in a ready position for the stronger engagement required when the reversing operation is to be carried out. In this operation the balls 168 will roll upwards onto the V-shaped grooves 167, 171 to the extent determined by the torque to be transmitted. This rolling movement effected under spring load will cause a cushioning of the peripheral engagement between the shoulders 90 and 178 which feature assists in avoiding damage on the shoulders as well as on the pilot tap.

When the sleeves 92 and 94 are displaced downwards by the snap-like movement described above it may occur that the top faces of the coupling shoulders 90, 178 abut against one another and prevent engagement between the shoulders. In such a case the springs 128 will still be slightly compressed in relationship to the starting position shown in FIG. 1. The frictional engagement existing between the end surfaces of said shoulders 90, 178 is overcome, however, by the frictional engagement produced by the cup spring 114 between the base face of the shoulders 104 projecting radially from the sleeve 92 and the top edge of the sleeve 94. In this way the end surfaces of the shoulders 90, 178, bearing against one another, are caused to slide relatively to one another until the shoulders interengage axially to full depth. Since in this definite position of engagement a reversing movement is to be imparted to the sleeves 92, 94 and the spindle 120 the shoulder 90 and the shoulders 104 and 106 must change their sides of engagement. As a consequence the shoulders 90 and 178 and also the shoulders 104, 106 will be displaced peripherally slightly less than half a revolution relative to one another from said axial position of engagement and before a peripheral coupling position is reached. The magnitude of this displacement depends on the peripheral extension of the shoulders. By this feature a delay of time is imparted to the coupling operation which further ensures that no damage is inflicted to the shoulders 90, 178 by incomplete interengagement between them. A similar delay is produced when the device is reset to direct drive and the shoulders 90 are caused to engage the shoulders 88.

When the unscrewing of the pilot or screw tap is completed, the parts of the device return to the positions shown in FIGURES 1, 3 and 7 by action of the spring 194. It should be noted that the balls 126 are restored to their position axially midway of the channel formed by the grooves 110, 122 due to the feature that prior to the axial displacement of the outgoing spindle 120 the balls constantly have transmitted a torque. This transmission of torque has kept the balls jammed in said channel. This engagement between the spindle 120 and the sleeve 94 is also maintained, due to the friction between the radial shoulder 104 of the sleeve 92 and the end surface of the sleeve 94 (FIG. 5) during the turning movement of the sleeve 92 towards the peripheral engagement with the sleeve 94 and the coupling 170.

While the direct drive described above is changing over to the reversed drive, the coupling members 54, 80, 64, 72 and 62 used for the direct drive are returned automatically to their ready positions shown in FIG. 3 for the direct drive to be repeated. This resetting movement is initiated as soon as the coupling sleeve 54 is released to rotate relatively to the outer sleeve 92, by the balls 80 sliding down on their sloping races 76 towards engagement with the recesses 78. Simultaneously the rings 62, 64 are brought closer to the ring flange 56 of the sleeve while the balls 72 after having slid along their races 74 reach the ends thereof and pass through the bores 70 to engagement with the grooves 68 of the upper ring 62. A remaining peripheral relative motion between said ring 62 and the intermediate ring 64 ensures that the balls 72 do not remain in positions right opposite the separating portions 196 of the grooves 68. The sloping races 74 have two purposes, the one consisting in maintaining sufficient engagement with the separating portions 196 so as to force the balls 80 to roll or slide up onto their races 76, the other consisting in avoiding any braking action against the portions 196 during the return of the balls 80 to the recesses 78.

While two more or less specific embodiments of the invention have been described it is to be understood that this is for purpose of illustration only, and that the invention is not to be limited thereby, but its scope is to be determined by the appended claims.

What I claim is:

1. A screw thread cutting device comprising a driving component, a driven component, torque transmitting members for transmitting direct drive between said components including coupling members, and torque transmitting members for transmitting drive in reversed direction between said components including reversed drive members operatively connectable with said driven component to rotate in the direction opposite that of the driving component, one of said coupling members being axially shiftable relatively to said components from a first position engaging the driving component to transmit torque between said components in direct drive relation to a second position engaging one of said reversed drive members to transmit torque between said components in reversed drive relation, said shiftable coupling member being adapted to be retained positively in either of its positions until a resilient member acting on said coupling member due to a displacement of said components relative one another has accumulated a force great enough to cause said coupling member to shift in a snapping movement to the other position.

2. A screw thread cutting device comprising a driving component and a driven component displaceable relative to one another between direct and reverse drive positions, torque transmitting members for transmitting direct drive between said components including coupling members, and torque transmitting members for transmitting drive in reversed direction between said components including reversed drive members operatively connectable with said driving component to rotate in the direction opposite that of the driving component, a first one of said coupling members being axially shiftable relatively to said components from a first position engaging the driving component to transmit torque between said components in direct drive relation to a second position engaging one of said reversed drive members to transmit torque between said components in reversed drive relation, said first coupling member being provided with a first abutment adapted for direct drive to engage an abutment provided on a second coupling member disposed between said first coupling member and the driving component and for drive in reversed direction an abutment provided on said reversed drive member, said first coupling member also being provided with a second abutment adapted in both direct drive and reversed drive to transmit torque to an abutment provided on a third coupling member mounted in constant driving connection with said driven component, and spring-actuated means retaining said first coupling member in either of its positions so as to cause a resilient member located between said driven component and said third coupling member to be compressed by displacement of said components towards either of their two final positions, said first coupling member being adapted not to change over from one to the other of its positions but upon overcoming of the action of said compressed resilient member.

3. A screw thread cutting device as claimed in claim 2 having the first and the third coupling members formed and disposed so as to follow one another in their axial displacement, but being rotationally movable relatively to one another within the limits constituted by their abutments.

4. A screw thread cutting device as claimed in claim 3 having the second abutment of said first coupling member extending radially over an end face of said third coupling member, an annular member being interposed between said first and third coupling members so as to create a friction torque between said second abutment and said end face.

5. A screw thread cutting device as claimed in claim 4, having grooves provided in opposed faces of said third coupling member and said driven component, said grooves registering with one another in pairs and presenting a part-circular cross-section, resilient members disposed in some pairs of said grooves and balls disposed in other pairs of said grooves, said balls being adapted to be caused to engage abutments provided on said third coupling member and said driven component during resetting of the components for drive in reversed direction.

6. A screw thread cutting device comprising a driving component, a driven component, torque transmitting members for transmitting direct drive between said components including coupling members, torque transmitting members for transmitting drive in reversed direction between said components including reversed drive members operatively connectable with said driving component to rotate in the direction opposite that of the driving component, said reversed drive members comprising a rotationally stationary retainer member for roller bodies which are kept, by means exerting pressure axially in touching contact with an internal roller way formed on the driving component and an external roller way formed on a reversing ring located within said driving component and adapted for reversed drive to be brought into driving contact with the driven component through a coupling adapted to vary said axially acting pressure so as to increase said pressure to a value only producing a torque sufficiently great to surmount the resistance of the driven component against reverse movement.

7. In a screw thread cutting device as claimed in claim 6, said coupling including a coupling ring adapted to follow the reversing ring in its rotational movement but when transmitting torque to the driven component to perform a limited peripherical movement relative to said reversing ring and by said movement through wedge action to produce the increased pressure on said roller bodies.

8. A screw thread cutting device as claimed in claim 7 having said roller bodies loaded in the axial direction by a resilient member acting on said coupling ring.

9. In a screw thread cutting device as claimed in claim 8, said coupling comprising balls disposed between said reversing ring and said coupling ring, said balls being adapted to co-operate with grooves provided in said rings and formed with sloping walls.

10. A screw thread cutting device as claimed in claim 9 having its reversing ring provided with an annular projection extending a right angles to the central axis of said reversing ring and kept pressed by said coupling ring against the end face of said roller bodies shaped as tapered rollers.

11. A screw thread cutting device comprising a driving component, a driven component, members for transmitting torque between said components including coupling members, and a releasing mechanism disposed between said driving and driven components and including first and second axially-displaceable annular members having torque transmitting locking members disposed between themselves and being adapted on excess of a predetermined torque to disengage from one another against the action of a resilient member located between said driving component and said first annular member, means to transmit said driving torque between said annular members including abutments provided on said first annular member, a first group of locking members, an intermediate annular member and a second group of locking members, said abutments being formed so as on excess of said predetermined torque to slide up onto said first group of locking members, said second group of locking members being adapted simultaneously to displace said intermediate annular member axially in relation to said second annular member so as to render said first group of locking members inoperative and to render sliding surfaces existing between said first annular member and said intermediate annular member operative to release said driven component of the torque.

12. A screw thread cutting device as claimed in claim 11 having said first annular member formed with circumferentially extending grooves separated by shoulders with sloping walls, said first annular member adjacent said grooves having flat sliding surfaces facing said intermediate annular member, the first group of locking members entering into said grooves and throughbores provided in said intermediate annular member, and said second group of locking members bearing on recesses provided in said intermediate annular member and peripheral grooves formed in said second annular member.

13. In a screw thread cutting device as claimed in claim 12, said intermediate annular member and said second annular member being rotatable to a limited extent in relationship to one another, said intermediate annular member adjacent said recesses having obliquely cut surfaces formed so as to allow the second group of locking members to be moved thereon after having left said recesses and thereby to remove said intermediate annular member under compression of said resilient member a further short distance from said second annular member.

14. A screw thread cutting device according to claim 13 having said second group of locking members in engagement with said obliquely cut surfaces also when said second annular member and said intermediate annular member are in the remote position of their relative motion, so as on release of said second annular member to cause said locking members through action by said resilient member automatically to return to said recesses.

15. A screw thread cutting device as claimed in claim 14 having said first group of locking members bearing on likewise obliquely cut surfaces provided on said second annular member.

16. A screw thread cutting device comprising a driving component, a driven component, torque transmitting members for transmitting direct drive between said components including a coupling member, and torque transmitting members for transmitting drive in reversed direction between said components including reversed drive members operatively connectable with said driving component to rotate in the direction opposite that of the driving component, said coupling member being axially shiftable relative to said components from a first end position engaging the driving component to transmit torque between said components in direct drive relation to a second end position engaging one of said reversed drive members to transmit torque between said components in reversed drive relation, said coupling member and the driven component having registering axially extending grooves, torque transferring balls engaging said grooves, and means to maintain said coupling member in torque transfer connection in each of said end positions with an axial force which is materially greater than the force required to overcome the rolling frictional resistance between said balls and said grooves.

References Cited in the file of this patent

UNITED STATES PATENTS

| | | |
|---|---|---|
| 2,324,922 | Graves | July 20, 1943 |
| 2,391,438 | Muir | Dec. 25, 1945 |
| 2,538,548 | Zimmerman | Jan. 16, 1951 |
| 2,597,849 | Alfredeen | May 27, 1952 |
| 2,718,017 | Anderson | Sept. 20, 1955 |
| 2,795,146 | Alfredeen | June 11, 1957 |